(12) United States Patent
Thomasset et al.

(10) Patent No.: US 12,448,179 B2
(45) Date of Patent: Oct. 21, 2025

(54) TUBULAR BODY FOR FORMING A PACKAGING AND PACKAGING THEREWITH

(71) Applicant: AISAPACK HOLDING SA, Vouvry (CH)

(72) Inventors: Jacques Thomasset, Neuvecelle (FR); Gilles Demaurex, Martigny (CH)

(73) Assignee: AISAPACK HOLDING SA, Vouvry (CH)

( * ) Notice: Subject to any disclaimer, the term of this patent is extended or adjusted under 35 U.S.C. 154(b) by 0 days.

(21) Appl. No.: 18/261,782

(22) PCT Filed: Feb. 28, 2022

(86) PCT No.: PCT/IB2022/051734
§ 371 (c)(1),
(2) Date: Jul. 17, 2023

(87) PCT Pub. No.: WO2022/185176
PCT Pub. Date: Sep. 9, 2022

(65) Prior Publication Data
US 2024/0109691 A1 Apr. 4, 2024

(30) Foreign Application Priority Data
Mar. 2, 2021 (EP) ..................... 21160249

(51) Int. Cl.
*B65D 35/10* (2006.01)
*B65D 3/20* (2006.01)
(Continued)

(52) U.S. Cl.
CPC .............. *B65D 35/10* (2013.01); *B65D 3/20* (2013.01); *B65D 3/28* (2013.01); *B65D 5/4279* (2013.01); *B65D 35/12* (2013.01)

(58) Field of Classification Search
CPC .............. B29C 66/723; B29C 66/7234; B29C 65/5021; B65D 35/10; B65D 3/20; B65D 3/28; B65D 5/4279; B65D 35/12
See application file for complete search history.

(56) References Cited

U.S. PATENT DOCUMENTS 2,119,926 A 6/1938 Quittner
4,132,331 A 1/1979 Magerle
(Continued)

FOREIGN PATENT DOCUMENTS

EP 0177470 A2 4/1986
EP 1260447 B1 6/2007
(Continued)

OTHER PUBLICATIONS

International Search Report for PCT/IB2022/051734 mailed Jun. 20, 2022, 3 pages.
(Continued)

*Primary Examiner* — Shawn M Braden
(74) *Attorney, Agent, or Firm* — NIXON & VANDERHYE (57) ABSTRACT

The cellulose-based packaging includes a tubular body obtained by welding or bonding a sheet, including at least one longitudinal weld linking the ends of said sheet, at least one internal welding strip situated inside the packaging to form the longitudinal weld, the internal strip including a sealing material which becomes liquid during the welding of the ends and fills cavities formed at the ends of the internal strip so that the packaging is leak-proof once welded.

14 Claims, 8 Drawing Sheets

Face A  Face B (51) Int. Cl.
  *B65D 3/28* (2006.01)
  *B65D 5/42* (2006.01)
  *B65D 35/12* (2006.01)

(56) References Cited

U.S. PATENT DOCUMENTS

| | | | |
|---|---|---|---|
| 4,664,284 A | | 5/1987 | Magerle |
| 4,733,800 A | * | 3/1988 | Bjorkengren ....... B29C 66/4322 |
| | | | 156/203 |
| 2009/0092792 A1 | * | 4/2009 | Thomasset .............. B29C 66/43 |
| | | | 156/304.3 |
| 2013/0313283 A1 | * | 11/2013 | Medico ................... B29C 65/40 |
| | | | 220/680 |

FOREIGN PATENT DOCUMENTS

| | | |
|---|---|---|
| EP | 1884348 A1 | 2/2008 |
| FR | 2505250 A1 | 11/1982 |
| GB | 1118632 A | 7/1968 |
| JP | 2013540082 A | 10/2013 |
| JP | 5466000 B2 | 1/2014 |
| SU | 1266466 A3 | 10/1986 |
| WO | 2007113780 A2 | 10/2007 |

OTHER PUBLICATIONS

Written Opinion of the ISA for PCT/IB2022/051734 mailed Jun. 20, 2022, 6 pages.
Search Report, issued in Russian Patent Application No. 2023120908/11 (045629) dated Jun. 19, 2025.
Office Action, issued in Japanese Patent Application No. 2023-535371 dated Jul. 29, 2025.

* cited by examiner

View in cross-section D-D

TUBULAR BODY FOR FORMING A PACKAGING AND PACKAGING THEREWITH

CORRESPONDING APPLICATION

The present application is the U.S. national phase of International Application No. PCT/IB2022/051734 filed Feb. 28, 2022, which designated the U.S. and claims priority to European application No 21160249.5, filed on Mar. 2, 2021 in the name of AISAPACK HOLDING SA, the entire contents of each of which being incorporated by reference in the present application.

TECHNICAL FIELD

The invention relates to the field of recyclable packagings comprising, in their manufacturing process, welding or bonding operations. More specifically, the invention relates to cellulose-based packagings comprising a tubular body obtained by welding or bonding a sheet. The invention applies in the field of packaging and in particular that of the flexible tubes intended to contain products such as creams or pastes, or the field of cans for containing liquids, replacing aluminium; or even the field of flasks for cosmetic products.

STATE OF THE ART

The Otani patent EP1260447B1 describes packagings made of paper pulp produced by moulding. The Otani patent offers numerous advantages because it makes it possible to obtain packagings with a high cellulose ratio. The method according to Otani notably makes it possible to produce packagings with threadings that have high strength and durability. However, the method by which these packagings are obtained has a long cycle time which does not allow production at a high rate and at a competitive cost. Furthermore, the method does not make it possible to locally adapt the thickness of the packaging, which is detrimental when wanting to produce flexible packagings such as tubes for example.

Publication EP 1 884 348 discloses a package formed from a multilayer thermoplastic film with abutted ends, including a first welded layer and a second partially or non-butt weldable layer and at least one thin strip covering the ends of the film, directly fixed to a surface of the second layer.

Publication WO2007/113780 discloses a package made from a thermoplastic film the ends of which are abutted, said film consisting of several layers including a first layer which at least is a sealing layer and a second layer which is only partly butt-sealed or not at all, and at least one strip of fine thickness covering said ends being directly fixed on one of the surfaces of the second layer, the melting point difference between the first and the other layer(s) being higher than 20° C.

Publication EP0177470 discloses a packaging tube of the laminate type having dead-fold characteristics, comprising a body of a metal foil containing laminate and a tube breast arranged at one end of the body, and an elongated strip of a metal foil containing laminate attached to the tube body and extending generally along the entire length thereof, the metal contents of the strip providing the dead-fold characteristics.

Plastic or metal-plastic or paper-plastic tubes produced by welding a tubular body onto a tube head such as flexible tubes are for example described in the publications FR2505250, GB1118632, U.S. Pat. Nos. 2,119,926 and 4,132,331. The issue of leaks at the intersection of the welds is not mentioned in these documents because the tubes described in these publications have a majority of plastic or synthetic material which melts at least partially or totally during the welding operation and avoids the formation of cavities. However, the prior art does not teach how to obtain leak-proof packagings when using mostly materials based on cellulose or on other equivalent materials (natural or synthetic) which do not melt under the effect of temperature.

The invention makes it possible to remedy the abovementioned problems and to produce leak-proof packagings which meet the market requirements.

Figure 1:
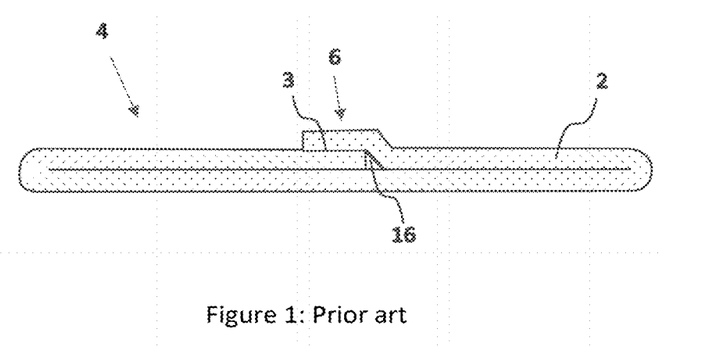
FIGS. 1 and 2 illustrate the problem to be solved linked to the manufacturing of a packaging based on cellulose by welding.
Figure 2:
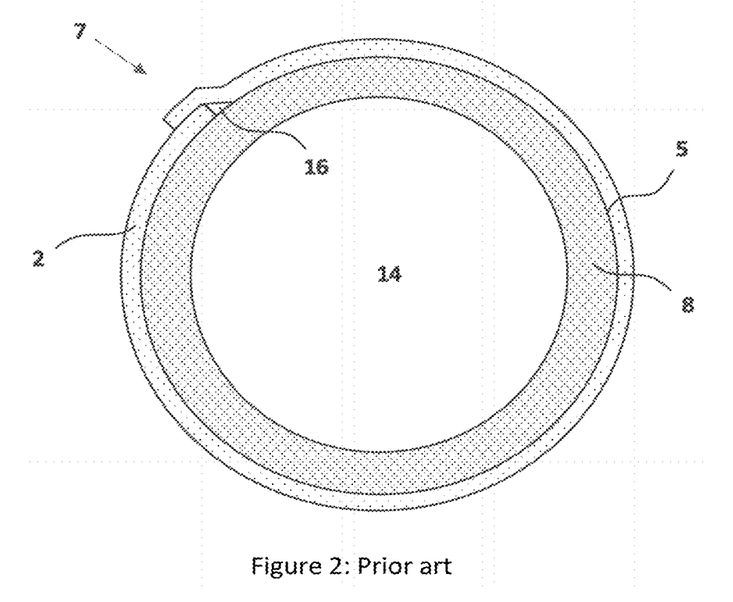

FIGS. 1 and 2 illustrate the problem to be solved for making cellulose-based packaging from the teachings of the prior art.

In the prior art, the cavity 16 is filled by the welding operations which make the plastic material present in the tubular body 2 and/or in the component 8 (such as a tube head) creep under the effect of temperature and pressure. Thus, the impermeability of the packaging can be produced.

With structures based on cellulose or on other equivalent materials which do not melt during the welding (or in any case which do not creep during the heating and/or compression), it becomes difficult, even impossible, to fill the cavity 16 during the welding operation because of the reduced quantity of material capable of creeping and the packagings which result therefrom are consequently not perfectly leak-proof to liquids and to gases since the cavity 16 of FIGS. 1 and 2 remains present.

SUMMARY AND PRINCIPLE OF THE INVENTION

The invention makes it possible to remedy the abovementioned drawbacks and makes it possible to manufacture a wide variety of cellulose-based packagings by welding at least one cellulose-based sheet and a component such as a tube head or a bottom. The invention allows packagings with a high quantity of cellulose or of material directly derived from the paper or cardboard industry to be produced at a high production rate and at a competitive cost. Consequently, the packagings produced according to the invention can be easily recycled in the paper sector unlike the packagings of the state of the art containing a majority of plastic or synthetic material.

The invention relates more specifically to the packagings comprising a tubular body obtained by welding or bonding a cellulose-based sheet and by welding or bonding at least one cellulose-based component.

More generally, the invention can be used to make packaging with materials which mostly remain solid during the welding operation and consequently cannot creep under the effect of temperature and of pressure.

Another advantage of the invention is to allow packagings to be obtained that are easily recyclable because the percentage of material added to allow the welding is significantly reduced. Most of the material forming the packaging is therefore recyclable in a conventional sector.

The invention for example makes it possible to make flexible packagings such as tubes for liquid, viscous or pasty and/or solid products (such as creams, pastes, liquids or cosmetic products), or to make packagings for liquid products such as flasks or cans, or even to make packaging for dry products such as coffee, powdered milk, or even powdered chocolate for example.

One advantage of the invention is to reduce the quantity of plastic or synthetic material forming the packaging while avoiding the leaks which appear usually when the quantity of synthetic material or of plastic material becomes too low. The invention makes it possible to solve the problem of leaks in the welded packagings containing a high rate of cellulose, the leak being primarily located at the intersection of two welds, for example in the case of a tube, the longitudinal weld of the tubular body and the transverse weld of the tube head onto the tubular body.

In the explanation of the invention, the term leak denotes, according to the context and the desired conservation properties:
- a solid leak: product in powder form which escapes from the packaging (big leak)
- a liquid leak: liquid product which escapes from the packaging (average leak)
- a gaseous leak: gas which escapes from the packaging or gas which enters into the packaging (small leak). For the packagings that require oxygen-barrier properties, the microleaks are detrimental because they considerably reduce the conservation time of the packaged product.

One aim of the invention is notably to propose a method and a product making it possible to avoid these leaks and these micro-leaks which are difficult to measure during production.

The packagings produced according to the invention comprise a tubular body formed by welding or bonding a sheet, for example of cellulose or of another equivalent material which does not flow during this welding and/or bonding operation. This so-called longitudinal weld of the tubular body comprises an internal welding strip and an external welding strip linking the ends of the cellulose sheet positioned end-to-end. These internal and external welding strips are necessary given the composition of the sheet forming the tubular body, namely essentially cellulose for example in one embodiment.

The invention notably comprises the feature of at least partly filling the cavities which are formed at the intersection of the welds by the material originating from the internal strip. Under the effect of the temperature and the pressure during the welding, this material becomes liquid and, by flowing, comes to fill the cavities, rendering the packaging leak-proof and therefore eliminating the abovementioned undesirable leaks.

According to the invention, the internal strip comprises at least one sealing layer composed of a material which becomes liquid during the welding step and fills the cavities. According to the invention, the sealing layer represents at least 1% of the volume of the internal strip, and preferably at least 5% of the volume of the strip.

According to a preferential embodiment of the invention, in the internal strip, only the sealing material which can also be a welding material becomes liquid during the welding.

According to one embodiment, the internal strip comprises a second layer which does not melt during the welding operation and confers great strength on the weld. This layer is, for example, based on high-strength paper, or based on bi-oriented PET or based on bi-oriented PP.

According to other embodiments, the internal strip can comprise sealing material, a second layer as described above and one or more other additional layers of the same composition or not.

According to a variant of the invention, the internal strip is composed only of sealing material.

Other variants and embodiments of the invention are described below.

In the embodiments, the invention relates to a tubular body for packaging intended to contain products in liquid, viscous or solid form. The tubular body comprises a sheet based on a material which does not flow or flows little during the welding thereof and at least one first longitudinal weld linking the ends of said sheet to form said tubular body. The tubular body comprises at least one internal welding strip situated inside the body to form said longitudinal weld, said internal strip comprising a sealing material which becomes liquid during the welding of the ends of the sheet and which is intended to fill cavities formed at the ends of the internal strip in order to render the packaging leak-proof.

In embodiments, the sheet is cellulose-based.

In embodiments, the tubular body comprises at least one second weld and a zone of intersection between said second weld and said first weld, said cavities being formed in the zone of intersection by said internal welding strip and filled by the sealing material.

In embodiments, the second weld links the sheet to a component.

In embodiments, the component can be a tube head, or a neck, and/or a bottom for example.

In embodiments, the second weld is an end weld of the tubular body, the end weld being preceded or not by a fold to approximately 180° to increase the pressure-resistance of the second weld.

In embodiments, the sealing material preferably represents at least 1% of the volume of the internal strip.

In embodiments, the sealing material can be formed by PE, or by PP, or be based on wax or on another resin, or even on an adhesive.

In embodiments, the internal strip can comprise a second layer which does not become liquid during the welding operation and which confers great strength on the weld.

In embodiments, the second layer can be based on paper, or on bi-oriented PET or on bi-oriented PP.

In embodiments, the internal strip has a width preferably equal to or greater than 2 mm.

In embodiments, the internal strip has a thickness preferably equal to or less than 100 microns.

In embodiments, the body can comprise an external welding strip situated on the outside of the packaging.

In embodiments, the external strip preferably has a width equal to or greater than 2 mm and/or a thickness equal to or less than 300 microns.

In embodiments, the present invention relates to a packaging comprising at least one tubular body as described in the present application.

BRIEF DESCRIPTION OF THE DRAWINGS

FIG. 1 illustrates the cross-sectional view of the end weld of a tubular body according to the knowledge from the prior art. The formation of the cavity 13 which does not make it possible to obtain leak-proof packagings can in particular be seen.

FIG. 2 illustrates the cross-sectional view of the weld of a tubular body onto a component according to the knowledge of the prior art. Here again, the formation of the cavity 13 which does not make it possible to obtain leak-proof packagings can be seen.

FIG. 3 represents the two opposite faces A and B of a cellulose-based tube.

FIG. 4 illustrates the section C-C of the tube illustrated in FIG. 1. The section C-C makes it possible to see the end weld of the tubular body. This figure shows how the invention makes it possible to solve the problem of leaks at the intersection of the longitudinal weld and of the end weld.

FIG. 5 illustrates the section D-D of the tube illustrated in FIG. 1. The section D-D makes it possible to see the weld between the tubular body and the component. This figure shows how the invention makes it possible to solve the problem of leaks at the intersection of the longitudinal weld and of the component weld.

DETAILED DESCRIPTION

1: cellulose-based packaging
2: tubular body
3: longitudinal weld
4: end weld
5: component weld
6: zone of intersection of the longitudinal weld and of the end weld
7: zone of intersection of the longitudinal weld and of the component weld
8: component, for example a tube head
9: cellulose-based layer of the tubular body
10: sealing layer of the tubular body
11: internal welding strip
12: external welding strip
13: cavities
14: inside of the packaging
15: fold of the tubular body
16: non-sealed cavity The invention relates in particular to packagings based on cellulose (or based on another equivalent material) and manufactured by welding or bonding. Hereinafter in the explanation of the invention, the term welding is used to describe assembly by welding or by bonding.

The packagings according to the invention comprise at least one tubular body obtained by welding a sheet, for example based on cellulose; and at least one component, for example based on cellulose, welded to the end of the tubular body.

The packaging comprises at least one first, so-called longitudinal weld, which results from the making of the tubular body from a cellulose-based sheet. The longitudinal weld is parallel to the axis of the tubular body.

The packaging also comprises a second weld which links the end of the tubular body to a component, said component being, for example, a head with an orifice for extraction of the product or, for example, a bottom. The weld of the end of the tubular body to the component cuts the longitudinal weld, for example at right angles.

Figure 3:
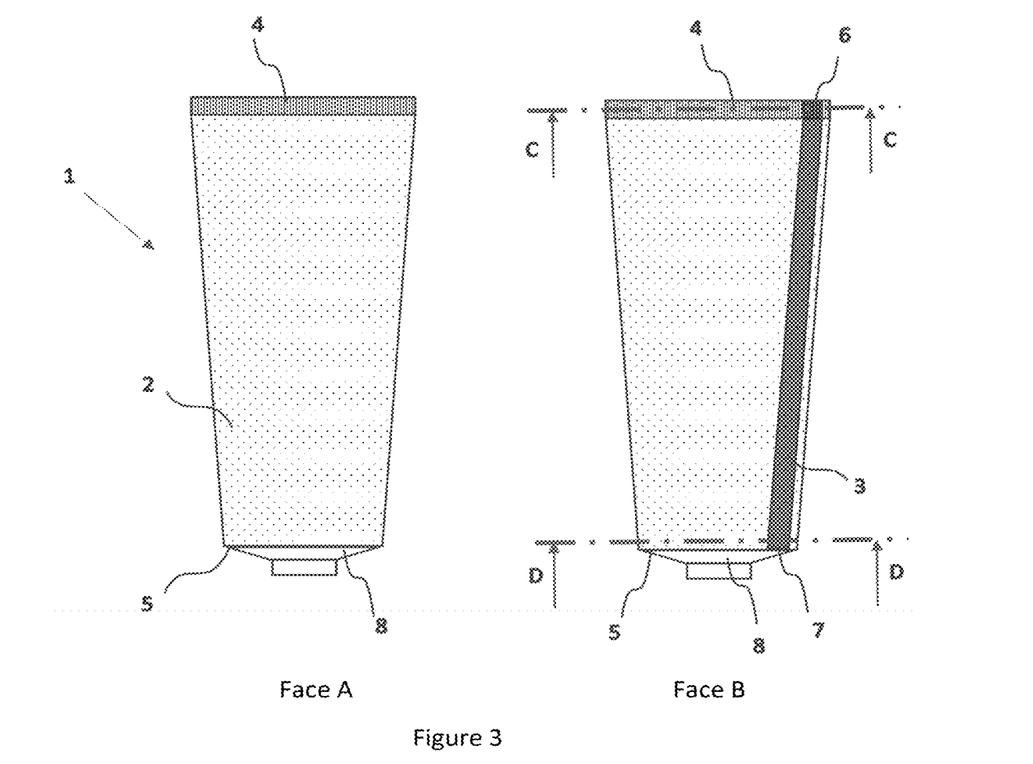
FIG. 3 illustrates an example of packaging produced according to the invention.

FIG. 3 illustrates an exemplary embodiment of the invention. FIG. 3 represents the two opposite faces A and B of a flexible tube manufactured according to the invention. This tube comprises a tubular body 2 formed from a cellulose-based sheet whose ends are welded. On the face B of the tube 1, the longitudinal weld 3 linking the ends of said sheet can be seen. The longitudinal weld 3 extends normally over the entire length of the tubular body 2.

The tube illustrated in FIG. 3 comprises a second weld 5 which links the end of the tubular body 2 to a component 8, also cellulose-based. The intersection between the longitudinal weld 3 and the component weld 5 forms a first zone of intersection 7 and the principle of the invention makes it possible to render the first zone of intersection 7 leak-proof.

Figure 4:
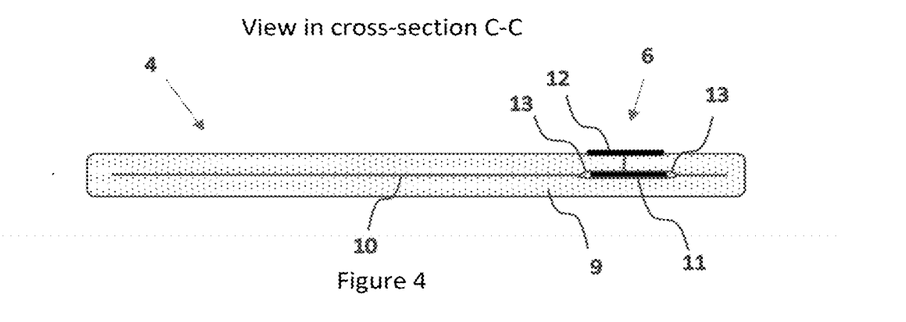

The tube illustrated in FIG. 3 comprises a third weld 4, called end weld, which closes the second end of the tubular body 2 by flattening and welding illustrated in FIG. 4. The intersection between the longitudinal weld 3 and the end weld 4 forms a second zone of intersection 6 and the principle of the invention makes it possible to render the second zone of intersection 6 leak-proof. According to the invention, the packaging can also comprise two end welds 4 in one embodiment.

According to the invention, the packaging is composed primarily of cellulose, that is to say the compositions commonly used in the paper industry. These compositions generally comprise a majority of cellulose (for example 70% or more), mineral fillers (for example calcium carbonate or kaolin), colorants or optical brighteners, binders (for example starch or latex), and possibly lignin. According to the invention, the packaging can also comprise thin barrier layers, for example to moisture or to oxygen. These layers can be made of thermoplastic resins such as PE, PP, EVOH, PVOH, PLA for example, or thin layers such as SiOx layers or metallized layers or even coatings or nanocoatings. Other materials equivalent to cellulose are of course possible and considered in the context of the present invention.

FIG. 4 illustrates the section C-C of the packaging illustrated in FIG. 3. The section C-C makes it possible to see the end weld 4 of the tubular body 2. The end weld 4 cuts the longitudinal weld 3 in the zone 6. According to the invention, the longitudinal weld 3 is produced by welding the ends of the sheet edge-to-edge using at least one first, internal welding strip 11 situated inside the packaging and a second, external welding strip 12 situated on the outside of the packaging. The internal strip 11 is held captive in the end weld 4 in the zone of intersection 6 between the end weld 4 and the longitudinal weld 3.

In FIG. 4, because of the intersection of these two welds 3 and 4, the presence of cavities 13 can be seen at the ends of the internal welding strip 11. These cavities are formed notably by the pressing of the strip into the compressible tubular body walls under the effect of the welding pressure. The cellulose-based structures like paper are generally compressible.

As can be seen in FIG. 4, one advantage of the invention is linked to the fact that the size of the cavities 13 is no longer linked to the thickness of the wall of the tubular body as illustrated in FIGS. 1 and 2; it is however directly linked to the thickness of the internal strip 11. By using an internal strip of small thickness, the invention makes it possible to significantly reduce the size of the cavities 13 and consequently the addition of sealing material necessary to fill said cavities 13 is itself also significantly reduced.

According to the invention, the thickness of the internal strip 11 is less than half the thickness of the wall of the tubular body 2 and preferably less than ⅓ of said thickness. According to embodiments of the invention, the thickness of the internal strip 11 is approximately equal to or less than 100 microns and preferably less than 60 microns, and the width of the internal strip 11 is approximately equal to or greater than 2 mm and preferably greater than 3 mm. According to other embodiments of the invention, the thickness of the internal strip 11 is equal to 30 microns and its width is equal to 4 mm. For the external strip 12, according to embodiments, its width is preferably approximately equal to or greater than 2 mm. According to embodiments, the thickness of the external strip 12 is approximately equal to or less than 300 microns, preferably less than 100 microns. Obviously, these values are indicative for illustrative examples and other values are possible according to the circumstances for example.

According to the invention, the cavities 13 which are formed at the ends of the internal strip 11 in the zones 6 and/or 7, are at least partly, and preferably totally, filled with a sealing material originating from said internal strip 11. This sealing material, under the effect of the temperature and of the pressure during the manufacturing of the packaging, becomes liquid and, by flowing, fills the cavities 13, rendering the packaging leak-proof.

According to the invention, the internal strip 11 comprises at least one sealing layer composed of a material which becomes liquid during the welding step and fills the cavities 13. According to the invention, the sealing layer represents at least 1% of the volume of the internal strip 11, and preferably at least 5% of the volume of the internal strip 11.

According to a preferential embodiment of the invention, in the internal strip 11, only the sealing material, which is also a welding material, becomes liquid during the welding.

According to another embodiment, the internal strip 11 comprises a second layer which does not become liquid during the welding operation and confers great strength on the weld. This second layer is, for example, based on very strong paper, or based on bi-oriented PET or based on bi-oriented PP.

According to a variant of the invention, the internal strip 11 comprises only sealing material.

The sealing material is, for example, made of PE or of PP or based on wax or another resin which passes from the solid state to the liquid state under the effect of the welding temperature. The sealing material can also be an adhesive. Other equivalent materials are possible and considered in the context of the present invention.

In FIG. 4, the cellulose-based layer 9 of the tubular body preferably also comprises a barrier layer which is not represented (to simplify) and which adds the properties desired with regard to the barrier to moisture or the barrier to oxygen or to aromas. The position and the number of these barrier layers in the structure of the tubular body 2 depends on the desired properties. Preferentially, for reasons of recyclability, functional barrier layers of very thin thickness such as SiOx layers, metallized layers, coatings or nanocoatings are used. Alternatively, barrier layers made of thermoplastic polymer such as, for example, EVOH, PVOH, PVDC, PE, PP can be used. These are of course nonlimiting examples.

In FIG. 4, the layer 10 represents the sealing layer of the tubular body which covers the internal surface of the tubular body. To allow the recycling of the packaging, this sealing layer is of very thin thickness. Preferentially, the sealing layer 10 is a sealing varnish or a layer of thin thickness that has equivalent weldability properties. Alternatively, the layer is made of thermoplastic resin such as, for example, polyethylene or polypropylene. These are of course nonlimiting examples.

Figure 5:
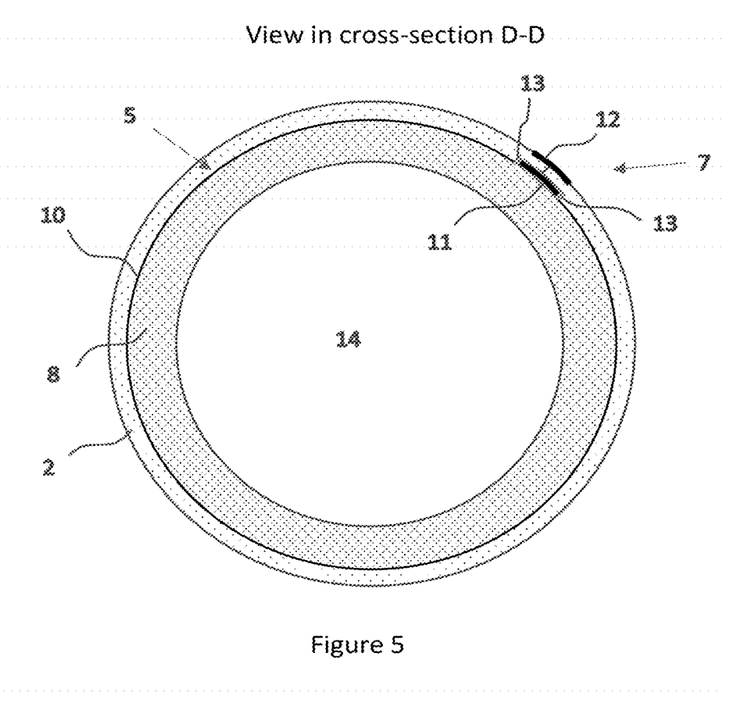

FIG. 5 illustrates another example of the invention when the cellulose-based tubular body 2 is welded onto a component 8 like a tube head. The principle of the invention makes it possible to solve the problem of sealing of the assembly at the intersection between the weld 5 of the component and the longitudinal weld 3 of the tubular body.

FIG. 5 illustrates the section D-D of the packaging illustrated in FIG. 3. The section D-D makes it possible to see the weld 5 of the tubular body 2 on the component 8 and notably the zone of intersection 7 between the component weld 5 and the longitudinal weld of the tubular body. According to one embodiment of the invention, the longitudinal weld is produced by welding the ends of the sheet 9 edge-to-edge using at least one internal welding strip 11 situated inside the packaging and an external welding strip 12 situated on the outside of the packaging. The internal strip 11 is held captive in the component weld in the zone of intersection 7 of the component weld 5 and the longitudinal weld 3.

In FIG. 5, the cavities 13 at the ends of the internal welding strip 11 can be seen. These cavities are formed notably because of the pressing of the internal welding strip 11 into the compressible walls of the tubular body 2 under the effect of the welding pressure.

According to the principle of the invention, the cavities 13 are at least partly, preferably totally, filled by sealing material originating from said internal strip 11. Under the effect of temperature and of pressure, this sealing material becomes liquid and, by flowing, fills the cavities 13, rendering the packaging leak-proof in the zone of intersection 7.

Figure 6:
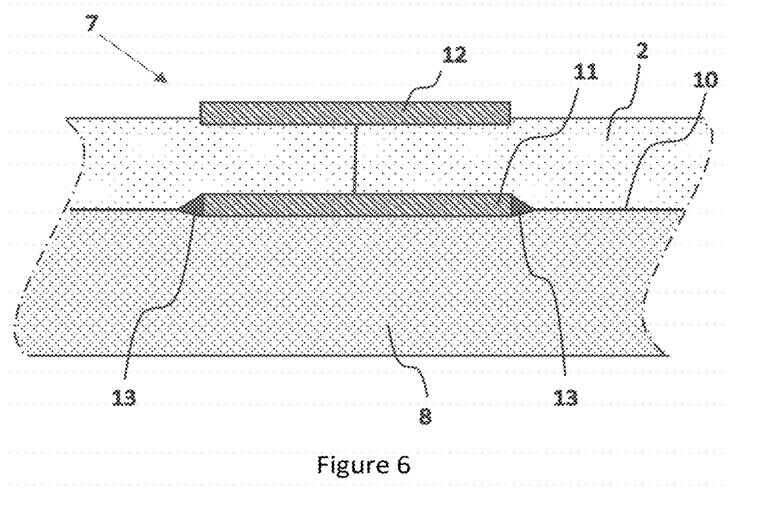
FIG. 6 illustrates more specifically the zone of intersection between the longitudinal weld and the component weld.

FIG. 6 illustrates a detail of the zone of intersection 7 between the component weld 5 and the longitudinal weld 3. FIG. 6 allows a better understanding of the benefit of the invention for obtaining packagings that are easily recyclable because the thickness of the sealing layers 10 can be significantly reduced. In fact, the invention makes it possible to reduce the thickness of the sealing layers 10 through the local addition of a surplus of sealing material through the internal strip 11 which makes it possible to fill the cavities 13. The local addition of sealing material which can also be a sealant makes it possible to guarantee the properties of impermeability of the packaging to liquids and to gases.

The invention makes it possible to use thin functional layers of very fine thickness both for the barrier layers and for the sealing layers 10. The invention therefore offers a great advantage for the production of cellulose-based recycled packaging.

The invention also allows the production of single-material recyclable plastic packagings with thin functional layers (micro-layers or nano-layers). These packagings are advantageous because they are easily recyclable. However, the manufacturing thereof by welding is often difficult because of the difficulty in obtaining leak-proof packagings. For example, the manufacture of tubes made of HDPE with very viscous grades is desired in order to be able to recycle these tubes in the HDPE flasks and bottles sector. The use of these viscous grades makes the welding operation more difficult because these new grades have a higher melting temperature and a much lower fluidity. Consequently, problems of leaks from these packagings appear at the intersection of the welds as detailed above. The invention makes it possible to remedy this problem by using the internal strip 11 to add sealing material. This sealing material added in negligible quantity has a high fluidity index and good sealing properties. For packagings made of HDPE, a sealing resin made of high-fluidity PE can be used. Other equivalent materials can of course be considered.

In FIG. 6, a butt weld of the sheet forming the tubular body 2 is represented, but this illustration is only a limiting example and other forms can be used: for example, the ends of the sheet can have complementary slopes, a bevel, overlap, have other complementary forms, etc. Furthermore, the internal strip 11 is illustrated embedded in the tube head 8 and in the body 2, but it could be embedded entirely in the head or in the body or mainly in one or in the other. All configurations are possible, also with the external strip 12.

Figure 7:
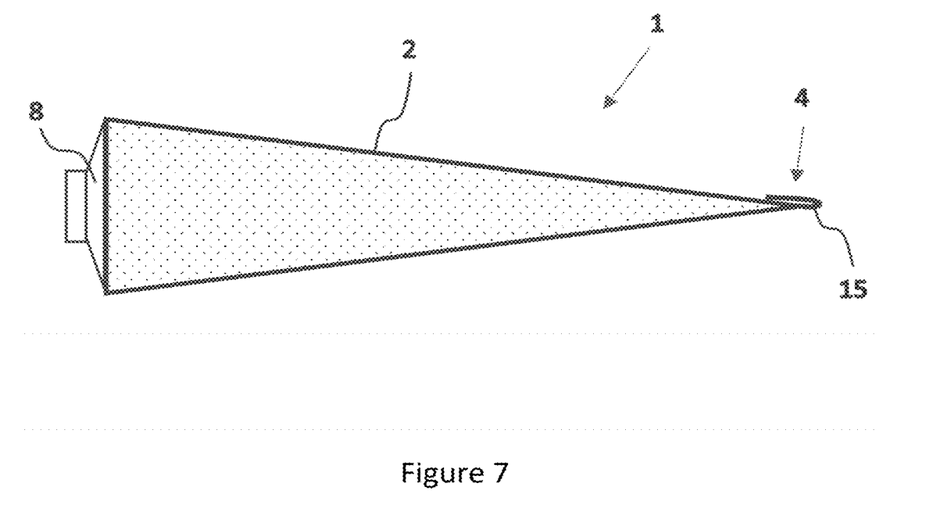
FIG. 7 illustrates an optional configuration of the end closure comprising an end weld and a fold situated upstream of said weld.

FIG. 7 illustrates another aspect of the invention that makes it possible to improve the strength of the end closure of a tube. FIG. 7 illustrates a flexible tube 1 comprising a tubular body 2 linked to a tube head 8 and with an end closure comprising an end weld 4 and a fold 15 situated on the outside of the end weld 4 and before it. It has been found that cellulose-based packagings had a lower strength resistance at the end weld because of a cohesive failure of the cellulose-based layer under the effect of a bursting strain on the packaging. It has been demonstrated that, by forming a fold 15 of the tubular body 2 before the final weld 4, it was possible to make the packaging much stronger.

Figure 8:
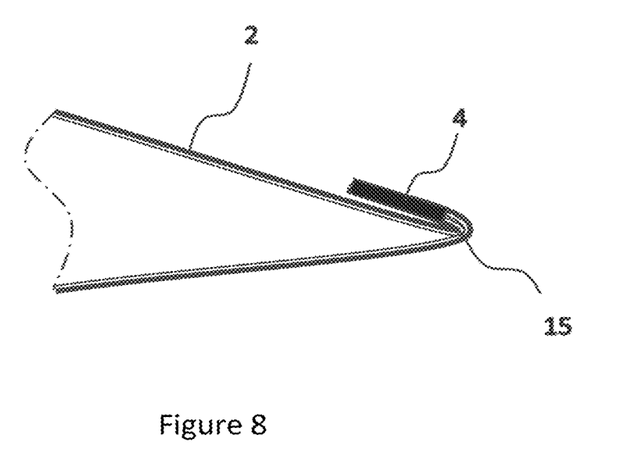
FIG. 8 illustrates a detailed view of the optional configuration of FIG. 7.

FIG. 8 illustrates the closure weld of the tube 1 of FIG. 7 in more detail. The tubular body 2 comprises an end weld 4 produced according to the principle of the invention. The end of the welded tube is then folded in order to form the fold to approximately 180° (for example) before and outside of the end weld 4, this construction having the effect of increasing pressure resistance of the end weld. In order to keep the folded end piece in position, many variants are possible. For example, the folded end piece can be bonded or welded against the wall of the packaging. One alternative consists in using a self-adhesive label to keep the tube end-piece folded against the wall of the tubular body 2. When the pressure increases inside the packaging, for example due to the effect of the pressure exerted to extract the product from the packaging, the fold 15 avoids the stressing of the welded zone 4 and thus increases the strength of the end closure.

Figure 9:
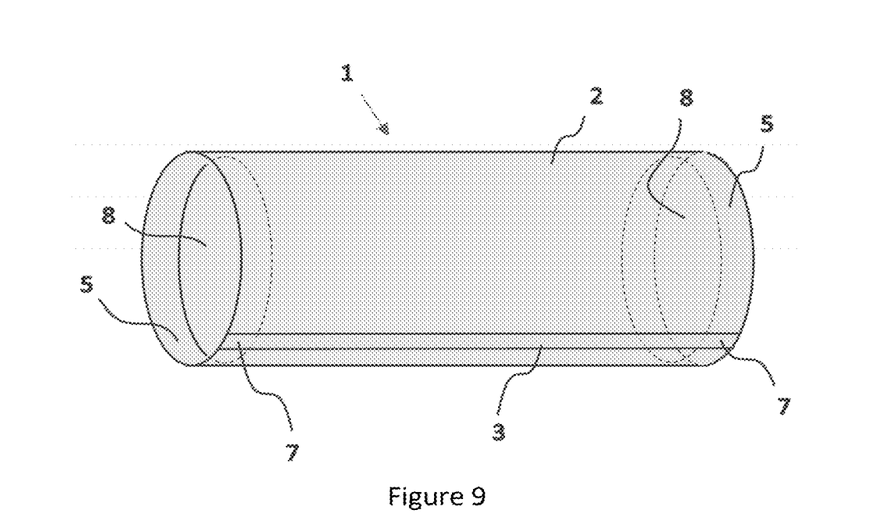
FIG. 9 illustrates a packaging produced according to the invention in can form. This packaging comprises two components welded onto a tubular body.
Figure 10:
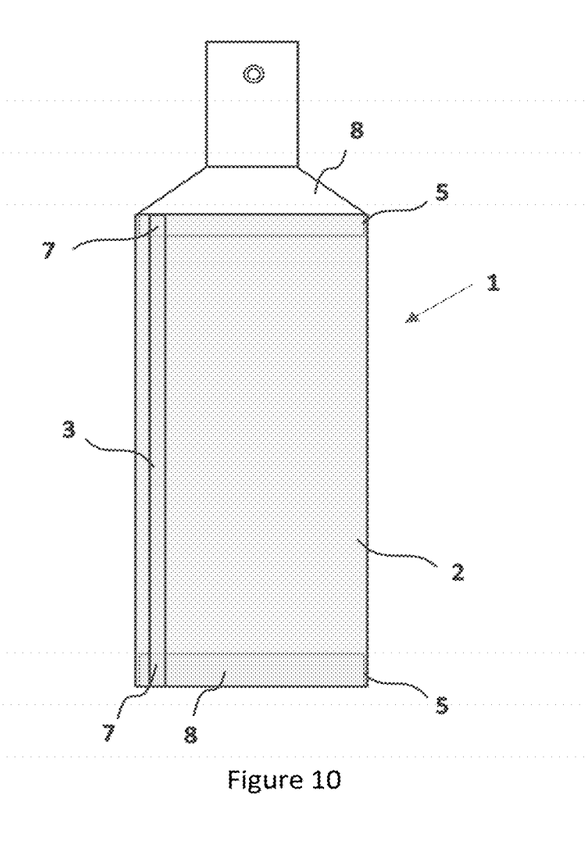
FIG. 10 illustrates a flask produced according to the invention and comprising two components welded onto a tubular body.

FIGS. 9 and 10 illustrate other examples of packagings produced according to the invention.

FIG. 9 represents a cellulose-based packaging of "can" type and intended to contain products such as liquids or powders. This packaging of cylindrical geometry, that can easily be stacked, comprises a tubular body 2 with a longitudinal weld 3 and two components 8 fixed respectively at each end by a weld 5. The zones of intersection 7 of the welds 3 and 5 are made liquid-tight and gas-tight by virtue of the principle of the invention as described in the present application. The packaging of "can" type comprises a first component 8 forming the bottom of the packaging, and a second component 8 comprising means for extracting the product from the packaging; said means being able to be an orifice closed by a membrane seal, or an easy-opening device based on tearing the material in order to create an orifice or any other means providing a packaging opening function.

FIG. 10 illustrates a flask produced by using the principles of the invention. This flask comprises a tubular body 2 with a longitudinal weld 3. Components 8 (for example a head or a neck and a bottom) are fixed to each end of the tubular body 2 via welds 5. The intersection of the welds 3 and 5 is made leak-proof by virtue of the production of the packaging according to the principle of the invention.

In other embodiments, the packaging can comprise, at each end of the tubular body 2, an end weld 4 as illustrated in FIGS. 7 and 8 (in place of the tube head 8 of FIG. 7).

The invention makes it possible to produce cellulose-based recyclable packagings. The packagings produced according to the invention comprise a proportion of paper or similar material greater than 50% and preferably greater than 85% and ideally greater than 95%.

The invention makes it possible to produce single-material plastic-based recyclable packagings, notably with viscous HDPE grades. According to the invention, packagings based on HDPE with a fluidity index lower than 1 (ASTM D1238 standard) and preferably lower than 0.5 can be used.

Figure 11:
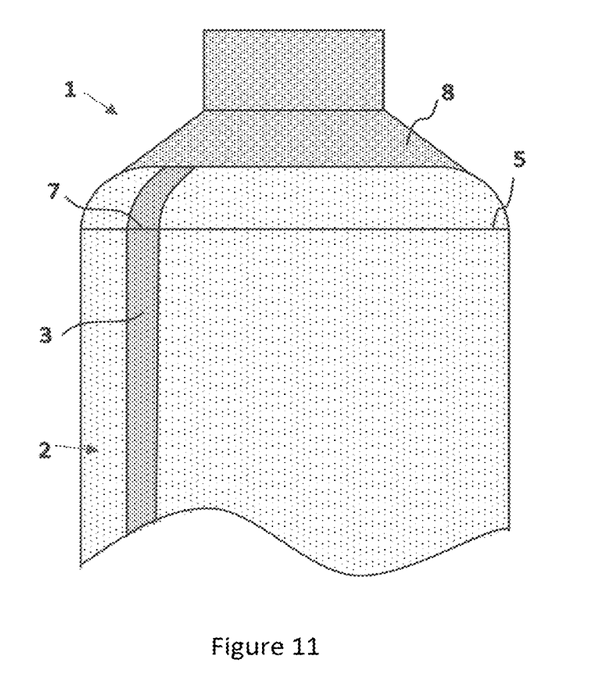
FIG. 11 illustrates a configuration of welding of the tubular body onto the component in which the diameter of the tubular body is reduced in the welding zone.

FIG. 11 illustrates another aspect of the invention when the diameter of the tubular body 2 is reduced in the welding zone. Such is the case notably when the end of the tubular body 2 is welded onto a surface of conical, toroidal or spherical type. In this case, the reduction of diameter can lead to the formation of folds of the tubular body 2 in the welding zone. When the tubular body 2 has a welding layer of very fine thickness, these folds form cavities which generate packaging leaks. Since these folds form additional cavities distributed randomly on the perimeter of the weld 5 between the tubular body 2 and the component 8, these cavities cannot be filled with the sealing material from the internal strip 11. It has been found that the use of a cellulose-based tubular body that is deformable in the solid state by at least 3% and preferably by at least 6% makes it possible to avoid the formation of folds when the diameter reduces. Thus, the use of a tubular body made of formable paper with a rate of deformation of at least 3% is advantageously used to produce packagings with the type of weld illustrated in FIG. 11.

FIG. 11 illustrates the welding of a tubular body 2 onto a tube head 8. With the weld zone 5 forming a surface of toroidal type, the diameter of the tubular body is consequently reduced in this zone. As can be seen in FIG. 11, the diameter of the tubular body 2 is most greatly reduced at its end. The tubular body 2 in the weld zone 5 represented in FIG. 11 does not have folds because its % deformation is greater than 3% and preferably greater than 6%.

Figure 12:
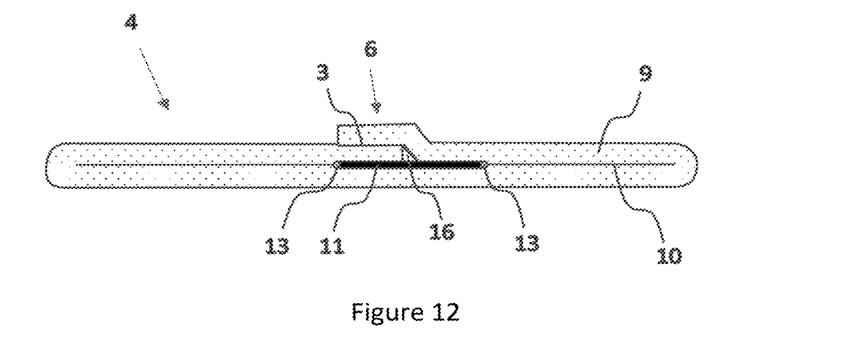
FIGS. 12 and 13 illustrate variants of the invention for other longitudinal weld configurations.
Figure 13:
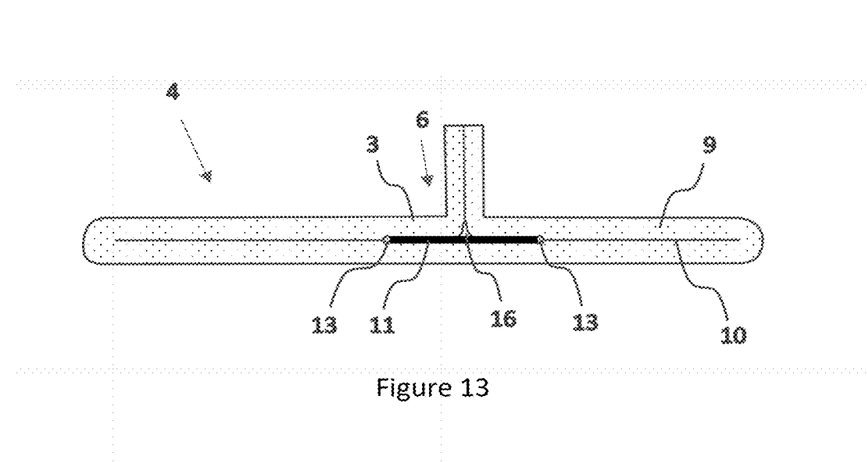

FIGS. 12 and 13 illustrate variants of the invention for other longitudinal weld configurations.

FIG. 12 illustrates the end weld 4 of a tubular body 2 whose longitudinal weld 3 is produced by overlap. The internal strip 11 covers the cavity 16 formed at the overlap, and the cavities 13 formed at the end of the strip 11 are filled by sealing material originating from the strip. According to a variant of the invention, the cavity 16 is at least partially filled by the sealing material originating from the strip.

FIG. 13 illustrates the end weld 4 of a tubular body 2 whose longitudinal weld 3 is produced by welding the internal face onto itself. The internal strip 11 covers the cavity 16 formed at the join of the welds, called "triple point", and the cavities 13 formed at the end of the strip 11 are filled by the sealing material originating from the strip.

According to a variant of the invention, the cavity 16 is at least partially filled by the sealing material originating from the strip.

Figure 14:
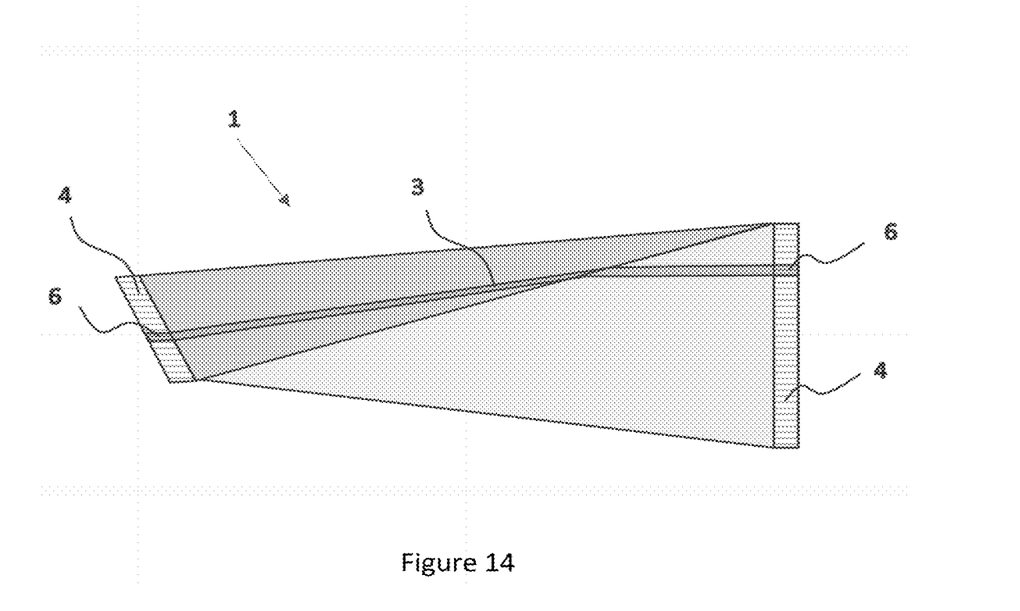
FIG. 14 illustrates a packaging of tetrahedral type with two end closures.

FIG. 14 illustrates a packaging of tetrahedral type manufactured according to the invention. The packaging 1 comprises a tubular body with a longitudinal weld 3. The tubular body is closed at the ends by two welds 4 oriented at right angles and resulting in the tetrahedral geometry of the packaging. The seal at the intersection 6 of the longitudinal 3 and end 4 welds is produced by the sealing material of the welding strip.

Figure 15:
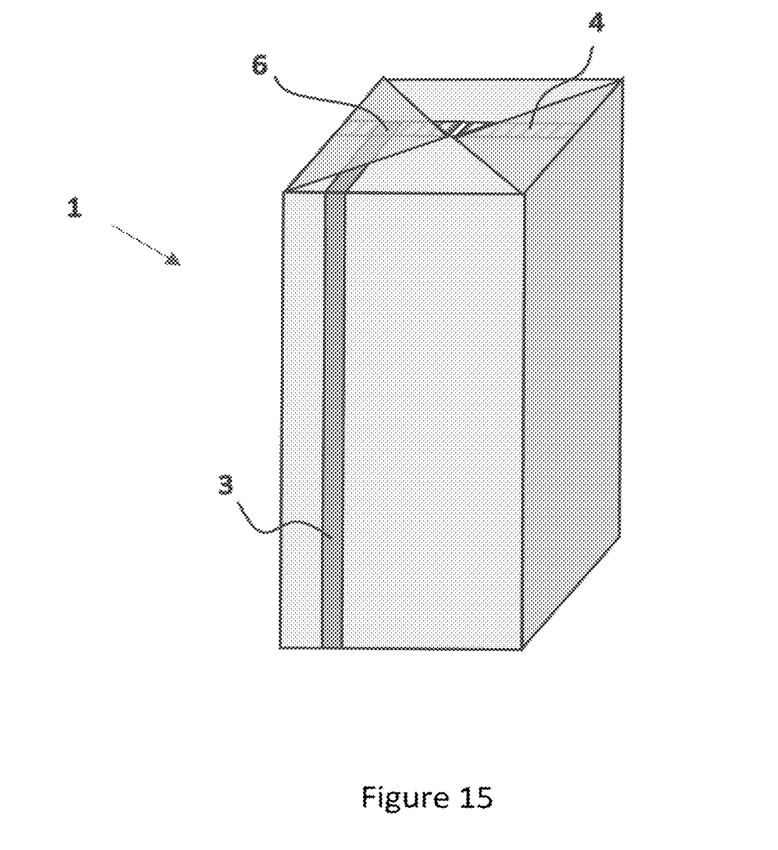
FIG. 15 illustrates a packaging of brick type comprising two end closures and folding operations.

FIG. 15 illustrates a packaging of brick type formed by welding and folding. The packaging 1 is formed by a tubular body with a longitudinal weld 3. The tubular body is closed by end welds 4 then shaped by folding, and possibly bonding, operations. By virtue of the invention, the packaging 1 comprises a high proportion of cellulose while guaranteeing a tightness of the packaging to liquids and gases, notably in the zones of intersection 6 of the longitudinal weld and the end welds according to the principles of the present invention.

The embodiments described in the present application are so described as by way of illustrative examples and should not be considered to be limiting. Other embodiments can involve means equivalent to those described for example.

The embodiments can also be combined with one another according to circumstances, or means used in one embodiment can be used in another embodiment.

The invention claimed is:

1. A tubular body for a packaging intended to contain products in liquid, viscous or solid form, said tubular body comprising:
   a sheet based on a material which does not melt or creep during welding thereof;
   a longitudinal first weld linking ends of said sheet to form said tubular body, an internal welding strip situated inside the body forming said longitudinal first weld; and
   a second weld cutting the longitudinal first weld forming an intersection of the longitudinal first weld and the second weld,
   wherein cavities are present at least at the intersection of the longitudinal first weld and the second weld,
   said internal welding strip comprises a sealing material which becomes liquid during the welding of the ends of the sheet, the sealing material in a liquid form being configured to fill the cavities present at the intersection between the longitudinal first weld and the second weld in order to render the packaging leak-proof.

2. The tubular body according to claim 1, wherein said sheet is cellulose-based.

3. The tubular body according to claim 1, wherein said second weld links the sheet to a component.

4. The tubular body according to claim 3, wherein the component is one or more of a tube head, a neck, and a bottom.

5. The tubular body according to claim 1, further comprising:
   a third weld that is an end weld of the tubular body, said end weld cutting the longitudinal first weld forming an intersection of the longitudinal first weld and the third weld, at least some of the cavities being present at the intersection of the longitudinal first weld and the third weld, the sealing material in the liquid form being configured to fill the cavities present at the intersection of the longitudinal first weld and the third weld, said end weld being preceded or not by a fold to approximately 180° to increase the pressure-resistance of the second weld.

6. The tubular body according to claim 1, wherein the sealing material represents at least 1% of the volume of the internal strip.

7. The tubular body according to claim 1, wherein the sealing material is formed by one of PE and PP, the sealing material being based on one or more of wax, another resin, and an adhesive.

8. The tubular body according to claim 1, wherein the internal strip comprises a second layer which does not become liquid during the welding operation.

9. The tubular body according to claim 8, wherein said second layer is based on paper, or on bi-oriented PET or on bi-oriented PP.

10. The tubular body according to claim 1, wherein the internal strip has a width equal to or greater than 2 mm.

11. The tubular body according to claim 1, wherein the internal strip has a thickness equal to or less than 100 microns.

12. The tubular body according to claim 1, further comprising an external welding strip situated on the outside of the packaging.

13. The tubular body according to claim 12, wherein the external strip has one or more of: (i) a width equal to or greater than 2 mm and (ii) a thickness equal to or less than 300 microns.

14. A packaging comprising:
   at least one tubular body according to claim 1.

* * * * *